(12) United States Patent
Li et al.

(10) Patent No.: US 11,275,759 B2
(45) Date of Patent: Mar. 15, 2022

(54) DATA STORAGE METHOD AND APPARATUS, SERVER, AND STORAGE MEDIUM

(71) Applicant: Tencent Technology (Shenzhen) Company Limited, Shenzhen (CN)

(72) Inventors: Haixiang Li, Shenzhen (CN); Xiaoyong Du, Shenzhen (CN); Wei Lu, Shenzhen (CN); Anqun Pan, Shenzhen (CN); Xiao Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 25 days.

(21) Appl. No.: 16/890,469

(22) Filed: Jun. 2, 2020

(65) Prior Publication Data
US 2020/0293545 A1    Sep. 17, 2020

Related U.S. Application Data

(63) Continuation of application No. PCT/CN2019/075421, filed on Feb. 19, 2019.

(30) Foreign Application Priority Data

Mar. 28, 2018    (CN) .......................... 201810266526.2

(51) Int. Cl.
*G06F 16/25* (2019.01)
*G06F 16/23* (2019.01)

(52) U.S. Cl.
CPC ........ *G06F 16/258* (2019.01); *G06F 16/2379* (2019.01)

(58) Field of Classification Search
None
See application file for complete search history.

(56) References Cited

U.S. PATENT DOCUMENTS 5,832,508 A * 11/1998 Sherman ............. G06F 16/2358
2008/0222209 A1* 9/2008 Nakano ................ G06F 16/221
(Continued)

FOREIGN PATENT DOCUMENTS

CN    103838844 A    6/2014
CN    105528425 A    4/2016
(Continued)

OTHER PUBLICATIONS

Documentation —> PostgreSQL 10: 9.25. System Information Functions [date unknown], postgresql.org, Chapter 9.25.*
(Continued)

*Primary Examiner* — Jason G Liao
(74) *Attorney, Agent, or Firm* — Morgan, Lewis & Bockius LLP

(57) ABSTRACT

This application discloses a data storage method and associated server, and a non-transitory computer readable storage medium, and belongs to the field of data processing technologies. The method includes: determining historical-state data of a to-be-dumped data item from a database, and determining a service requirement of the historical-state data; determining a target storage format of the historical-state data according to the service requirement; and dumping the historical-state data according to the target storage format.

20 Claims, 7 Drawing Sheets

(56) References Cited

U.S. PATENT DOCUMENTS

2018/0253467 A1* 9/2018 Gurajada ............... G06F 16/27
2019/0171743 A1* 6/2019 Ding ..................... G06F 16/217

FOREIGN PATENT DOCUMENTS

| CN | 106127006 A | 11/2016 |
| CN | 107273403 A | 10/2017 |
| CN | 107682395 A | 2/2018 |

OTHER PUBLICATIONS

Documentation —> PostgreSQL 10: 67.6. Database Page Layout [date unknown], postgresql.org, Chapter 67.6.*

Versioning policy [date unknown], postgresql.org, https://www.postgresql.org/support/versioning/.*

Jnk et al., What's the anatomy of a columnstore index? Mar. 6, 2012, Stack Exchange, https://dba.stackexchange.com/questions/10411/whats-the-anatomy-of-a-columnstore-index.*

May et al., SAP HANA—The Evolution of an In-Memory DBMS from Pure OLAP Processing Towards Mixed Workloads 2017, Gesellschaft für Informatik, 545.*

Sharma, Oracle System change number: An Introduction May 23, 2016, red-gate.com, https://www.red-gate.com/simple-talk/databases/oracle-databases/oracle-system-change-number-an-introduction/.*

Kreps, The Log: What every software engineer should know about real-time data's unifying abstraction Dec. 16, 2013, https://engineering.linkedin.com/distributed-systems/log-what-every-software-engineer-should-know-about-real-time-datas-unifying.*

Difference Between OLTP and OLAP date unknown [captured by archive.org on Nov. 18, 2016], techdifferences.com, https://web.archive.org/web/20161118115216/https://techdifferences.com/difference-between-oltp-and-olap.html.*

Riegger et al., MV-PBT: Multi-Version Index for Large Datasets and HTAP Workloads Oct. 17, 2019, arXiv, https://arxiv.org/pdf/1910.08023.pdf.*

Tencent Technology, ISR, PCT/CN2019/075421, May 28, 2019, 2 pgs.

Tencent Technology, WO, PCT/CN2019/075421, May 28, 2019, 3 pgs.

Tencent Technology, IPRP, PCT/CN2019/075421, Sep. 29, 2020, 4 pgs.

* cited by examiner

DATA STORAGE METHOD AND APPARATUS, SERVER, AND STORAGE MEDIUM

CROSS-REFERENCE TO RELATED APPLICATIONS

This application is a continuation application of PCT Application No. PCT/CN2019/075421, entitled "METHOD AND DEVICE FOR STORING DATA, SERVER, AND STORAGE MEDIUM" filed on Feb. 19, 2019, which claims priority to Chinese Patent Application No. 201810266526.2, entitled "DATA STORAGE METHOD AND APPARATUS, SERVER, AND STORAGE MEDIUM" filed with the Chinese National Intellectual Property Administration on Mar. 28, 2018, all of which are incorporated by reference in their entirety.

FIELD OF THE TECHNOLOGY

This application relates to the field of information processing technologies, and in particular, to a data storage method and apparatus, a server, and a storage medium.

BACKGROUND OF THE DISCLOSURE

In a data processing system, especially in a scenario such as an online analytical processing (OLAP) system, a data warehouse, and big data analysis, it is often necessary to obtain data from a database and perform analysis processing based on the obtained data. Because services may be continuously updated, one data item logically includes version data corresponding to a plurality of states. In this way, full-state (current-state, transition-state, and historical-state) data of one data item is saved, making it convenient for a system to track historical-state data and thoroughly mine the value of data (any data is valuable, and no historical-state data can be discarded). How to store full-state data of a data item has great significance.

SUMMARY

An embodiment of this application provides a data storage method performed at a server, including:
determining historical-state data of a to-be-dumped data item from a database;
determining a service requirement of the historical-state data;
determining a target storage format of the historical-state data according to the service requirement; and
dumping the historical-state data according to the target storage format.

An embodiment of this application further provides a server, including: a processor and a memory, the memory storing at least one instruction, at least one program, and a code set or an instruction set, and the instruction, the program, and the code set or the instruction set being loaded and executed by the processor to implement operations performed in the data storage method described above.

An embodiment of this application further provides a computer-readable storage medium, storing at least one instruction, at least one program, and a code set or an instruction set, the instruction, the program, and the code set or the instruction set being loaded and executed by a processor to implement operations performed in the data storage method described above.

BRIEF DESCRIPTION OF THE DRAWINGS

FIG. 1-2 is a schematic diagram of a logical storage format of a plurality of versions of data of a data item according to an embodiment of this application.

FIG. 1-3 is a flowchart of a data storage method according to an embodiment of this application.

FIG. 2-1 is a flowchart of a data storage method according to an embodiment of this application.

FIG. 2-2 is a schematic diagram of a data storage structure of a row storage format according to an embodiment of this application.

FIG. 2-3 is a schematic diagram of a data storage structure of a column storage format according to an embodiment of this application.

FIG. 2-4 is a schematic structural diagram of a cache according to an embodiment of this application.

FIG. 3-1 is a schematic structural diagram of a data storage apparatus according to an embodiment of this application.

FIG. 3-2 is a schematic structural diagram of another data storage apparatus according to an embodiment of this application.

FIG. 3-3 is a schematic structural diagram of another data storage apparatus according to an embodiment of this application.

FIG. 4 is a schematic structural diagram of a server according to an embodiment of this application.

DESCRIPTION OF EMBODIMENTS

To make the objectives, technical solutions, and advantages of this application clearer, the following further describes implementations of this application in detail with reference to the accompanying drawings.

Figure 1:
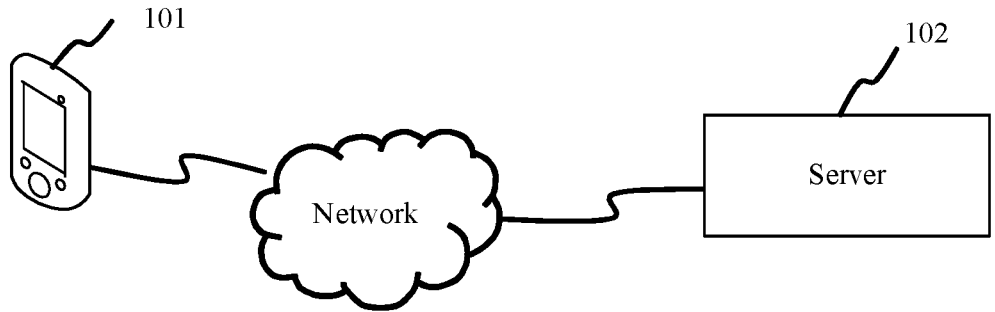
FIG. 1-1 is a schematic diagram of an application environment of data storage according to an embodiment of this application.

An embodiment of this application provides an application environment of data storage. Referring to FIG. 1-1, the application environment includes a terminal 101 and a server 102. The terminal 101 may access the server 102 through a network, and obtain version data of a data item from a database of the server 102, so as to perform transactional processing, analytical processing, or the like according to the version data of the data item.

The terminal 101 may be any device such as a mobile phone terminal, a portable Android device (PAD) terminal or a computer terminal on which an application having a data access function is installed. The server 102 includes a database, the database storing at least one tuple, one tuple storing one or more versions of data of one data item.

In some embodiments, the server 102 periodically clears historical-state data of a data item in the database, and stores only current-state data and transitional-state data of the data item. Because any data is valuable, no historical-state data of a data item can be discarded. After the historical-state data of the data item is cleared, the server 102 cannot track the historical-state data from the database, and data cannot be tracked and analyzed.

In some embodiments of this application, the server 102 may store historical-state data of a data item in the database in a manner of dumping. That is, the historical-state data of the data item in the database is additionally stored into another storage space instead of being cleared in a manner of clearing. In other words, the server 102 stores full-state data of a data item. Full states are different life cycle states of a data item and include a current state, a transitional state, and a historical state. In addition, when dumping the historical-state data of the data item, the server 102 may determine a target storage format of the historical-state data of the data item based on a service requirement of the terminal 101 for the historical-state data of the data item, and dump the historical-state data of the data item based on the target storage format, so that not only the integrity of version data of the data item is ensured, but also the historical-state data of the data item can be flexibly stored in different storage formats, thereby improving the efficiency of reading the historical-state data by the terminal and the flexibility. In addition, in this application, the historical-state data of the data item is dumped, so that the database stores data in any state of the data item, so as to support the acquisition and calculation of incremental data within any time period by the terminal 101, thereby providing a new concept and method for implementing a temporal database.

In this embodiment of this application, the current-state data and the transitional-state data of the data item are stored in a row storage format, and it is determined by using the service requirement whether to dump the historical-state data of the data item in a row storage format or column storage format. Therefore, current-state data, transitional-state data, and historical-state data of one same data item are stored in a hybrid format of a row storage format and a column storage format, so as to implement the function of a hybrid transactional/analytical processing (HTAP) database.

A conventional HTAP means that data is stored in a hybrid row-column format. The meaning of the HTAP in this embodiment of this application is different from that of the conventional HTAP. The HTAP in this embodiment of this application means that the current-state data and the transitional-state data of the data item are stored in a row storage format, and the historical-state data of the data item is stored in a row storage format or column storage format that is determined by using the service requirement. That is, the HTAP in this embodiment of this application means that different versions of data of one same data item are stored in a hybrid row-column format. The current-state data and the transitional-state data of the data item are stored in internal memory, and the historical-state data of the data item may be stored in the internal memory or may be stored in a data page.

The current-state data of the data item is the latest k versions of data of the data item. The transitional-state data of the data item is data stored in a transition page. The historical-state data of the data item is data other than the current-state data and the transitional-state data in data in of the data item. The value of k may be set and changed as required. In this embodiment of this application, the value of k is not specifically limited. For example, a default value of k may be 10.

Figures 1, 2:
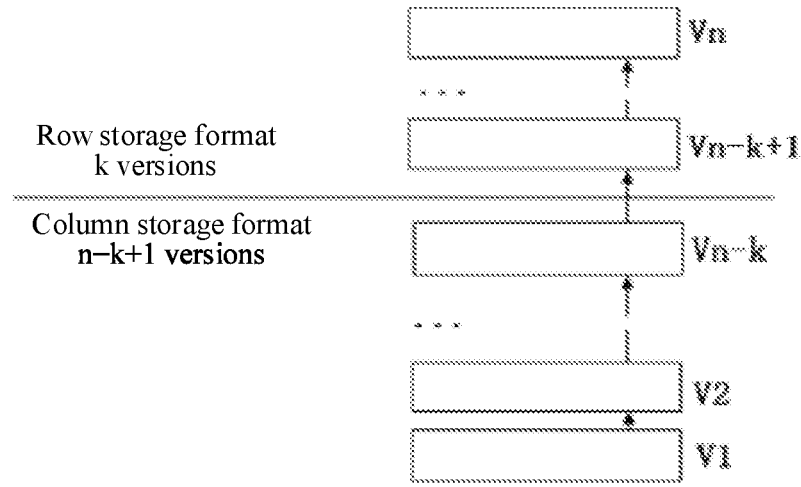

In a case that the target storage format of the historical-state data of the data item is a column storage format, referring to FIG. 1-2, when the data item includes n versions of data, the n versions of data are: V1 to Vn. V1 to Vn–k are the historical-state data, and Vn–k+1 to Vn are the current-state data. The server 102 stores V1 to Vn–k in a column storage format and stores Vn–k+1 to Vn in a row storage format.

Figures 1, 2, 3:
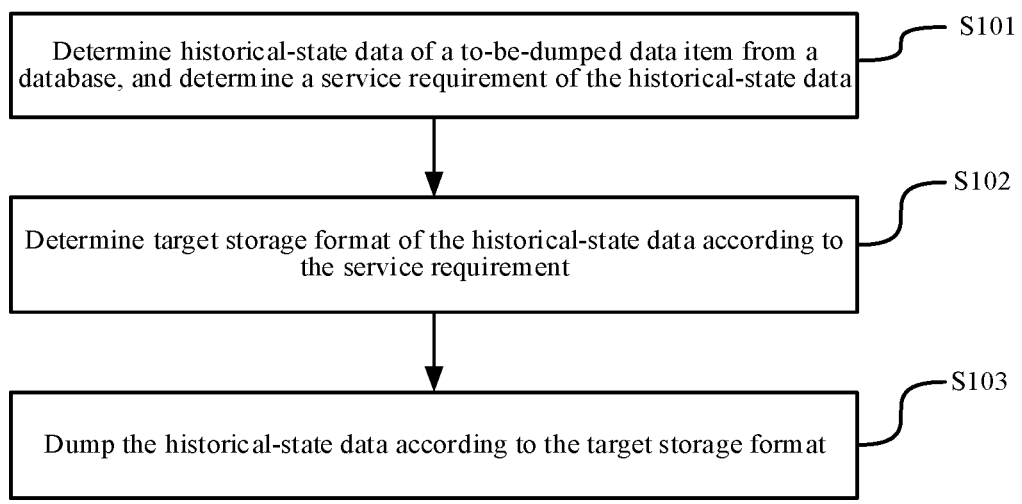

Based on the application environment of data storage shown in FIG. 1-1, an embodiment of this application provides a data storage method performed by a server. FIG. 1-3 is a flowchart of a data storage method according to an embodiment of this application. As shown in FIG. 1-3, the method includes the following steps:

Step S101: Determine historical-state data of a to-be-dumped data item from a database, and determine a service requirement of the historical-state data.

Step S102: Determine target storage format of the historical-state data according to the service requirement.

Step S103: Dump the historical-state data according to the target storage format.

In the foregoing technical solution, a server determines historical-state data of a to-be-dumped data item from a database, and determines a service requirement of the historical-state data; and dumps the historical-state data according to a target storage format corresponding to the service requirement. Therefore, not only full-state data (current-state data, transitional-state data, and the historical-state data) of the data item is stored, but also the historical-state data can be flexibly stored in different storage formats, thereby improving flexibility.

An embodiment of this application provides a data storage method. The method may be performed by a server. Referring to FIG. 2-1, the method includes the following steps:

Step S201: The server determines historical-state data of a to-be-dumped data item from a database.

An engine of the database periodically performs a VACUUM operation such as PostgreSQL and a Purge operation such as MySQL. However, instead of deleting historical-state data, the engine dumps the historical-state data of data items in the database. A timing mechanism is used for the timing of dumping, and is periodically started. Therefore, within each preset duration, the server determines historical-state data of a to-be-dumped data item from the database. The preset duration may be set and changed as required. In this embodiment of this application, the preset duration is not specifically limited. The data item may be any data item in the database.

Step S202: The server determines a service requirement of the historical-state data of the data item.

Before reading the historical-state data of the data item form the server, a terminal transmits the service requirement of the historical-state data of the data item to the server. The server receives the service requirement of the historical-state data of the data item. The service requirement may be transactional processing or an analytical application.

Step S203: The server determines a target storage format of the historical-state data of the data item according to the service requirement.

Different service requirements correspond to different data storage formats, that is, correspondences between service requirements and storage formats are stored in the server. Correspondingly, this step may be: obtaining, by the server, a target storage format of the historical-state data of the data item from the correspondences between the service requirements and the storage formats according to the service requirement.

For example, when the service requirement of the historical-state data of the data item is transactional processing, the target storage format of the historical-state data of the data item is a row storage format; and when the service requirement of the historical-state data of the data item is an analytical application, the target storage format of the historical-state data of the data item is a column storage format.

Step S204: The server dumps the historical-state data of the data item according to the target storage format.

When the target storage format is a row storage format, the server dumps the historical-state data of the data item in a row storage format. When the target storage format is a column storage format, the server dumps the historical-state data of the data item in a column storage format. The historical-state data in a row storage format may be stored in the database in an internal-memory structure or may be stored in the database in a data-page structure.

(A): When the target storage format is a row storage format, and the historical-state data of the data item is stored in the database in a data-page structure, this step may be implemented through the following steps (1) to (3), including:

(1): The server stores the historical-state data of the data item into a tuple of a page body of a row storage data page.

The row storage data page includes a page body, a page header, and a page footer. The page header is followed by the page body, and the page body is followed by the page footer. The page header is used for storing a transaction ID (xid), and the page body is used for storing at least one tuple, each tuple storing version data of a data item. The page footer is used for storing tuple information of the tuples stored in the page body. The server stores historical-state information of the data item in the tuples. The tuples in the row storage data page are sequentially stored in a direction from the page header to the page footer.

One tuple may store a plurality of versions of data of one data item, and each version of data has a hidden column, the hidden column being used for storing an xid of an operation transaction of the version of data. In one same row storage data page, at least one version of data of one data item is stored, and at most k versions of data of one same data item are stored. Information about a quantity of versions of data is stored in one tuple and is represented by x of the tuple. For example, when the value of x is 3, it represents that the tuple stores three versions of data. Because one tuple may store a plurality of versions of data of one data item, a data item having a plurality of versions of data may occupy more than one page. When the row storage data page is split, "next" in tuple information of the tuple is pointed to a next row storage data page.

(2): The server determines an xid of the earliest version of data in the tuple based on the tuple in the row storage data page, and stores the xid into the page header of the row storage data page.

The page header has a field xid_min, the field xid_min being used for storing an xid of the earliest version of data in all versions of data of all tuples in the row storage data page. The xid may be used for constructing an xid index of a page level, so as to speed up data query based on a transaction snapshot.

An xid is a 2-tuple and is formed by {t_min, t_xmax}, where t_min is a birth time of a transaction, and t_xmax is a death time of the transaction. Because the xid of the earliest version of data is the value of a 1-tuple, the xid of the earliest version of data is t_min or t_xmax in the xid. Correspondingly, steps of determining, by the server, an xid of the earliest version of data in the tuple based on the tuple in the row storage data page may be:

1): The server uses a birth time of the tuple as the xid of the earliest version of data in a case that the tuple is generated by an insertion operation or is an old version generated by an update operation.

In a case that the tuple is generated by an insertion operation or the tuple is an old version generated by an update operation, merely t_min of the tuple has a value, and t_xmax is null, and the server then uses t_min of the tuple as the xid of the earliest version of data.

2): The server uses a death time of the tuple as the xid of the earliest version of data in a case that the tuple is generated by a deletion operation or is a new version generated by an update operation.

In a case that the tuple is generated by a deletion operation or is a new version generated by an update operation, both t_min and t_xmax have values, and the server uses t_xmax as the xid of the earliest version of data.

(3): The server determines tuple information of the tuple, and stores the tuple information into the page footer of the row storage data page.

The page footer is located at the bottom of the row storage data page. The row storage page footer is used for storing the tuple information and is further used for storing check information of a data page. Tuples are sequentially stored in a direction from the page header to the page footer in the row storage data page, and tuple information of the tuples is sequentially stored in a direction from the page footer to the page header. Therefore, the tuples and tuple information form a process starting from two ends toward the middle, until spare space in the middle can no longer store a next tuple and tuple information of the next tuple.

The tuple information of the tuple is information related to the tuple. The tuple information of the tuple includes:

a) tupleID, used for representing an identifier of the tuple;

b) xid, used for representing an xid of the earliest version of data in all versions of data in the tuple;

c) next, pointing to an offset of the tuple in the row storage data page or a location of another page in which some versions of data of the tuple exists;

d) i, used for identifying a quantity of versions of the tuple in the row storage data page; and e): at least one piece of column information, where in a case that the tuple includes x column objects, the tuple information includes x pieces of column information, and one column object corresponds to one piece of column information.

The column information indicates a column object stored in a column storage format and a location at which a plurality of versions of information of the column object are stored. The column information includes a column ID, a segment address, a page address, and a page offset. The column ID is used for identifying the column object. The segment address, page address, and the page offset are combined for identifying a storage location of the column object. The column object is data in a column storage format, and the data in a column storage format is usually cold data and is stored in external storage.

The historical-state data may be stored in a conventional data-page structure or may be stored in an internal-memory structure. In this embodiment of this application, a storage structure of the row storage format is not specifically limited. In this embodiment of this application, an example in which the historical-state data is stored in the conventional data-page structure is used for description. Correspondingly, the row storage data page in a row storage format is shown in FIG. 2-2. The row storage data page in a row storage format includes a page header 211, a page body 212, and a page footer 213. The page header 211 stores an xid of the earliest version of data in tuples. The page body 212 stores a plurality of tuples, one tuple storing one or more versions of data of one data item. The tuples are sequentially stored in a direction from the page header to the page footer. The page footer 213 is used for storing page check information 214 and tuple information 215 of the plurality of tuples, the tuple information being sequentially stored in a direction from the page footer to the page header. The tuple information includes a tuple identifier tupleID 2151, an xid 2152 of the earliest version of data in all versions of data, next 2153 pointing to an offset of a tuple in this row storage data page or a location of another page in which some versions of data of this tuple is stored, a quantity 2154 of pieces of column information, and column information 2155. The column information includes: a column ID identifying a column object, a segment address, a page address, and a page offset.

In this embodiment of this application, an example in which the historical-state data in a row storage format is in a data-page structure is used for description. However, in this embodiment of this application, the historical-state data is not limited to the data-page structure. The implementation of this embodiment of this application is also applicable to internal memory. That is, the historical-state data may also be stored in an internal-memory structure in this embodiment of this application. When the historical-state data is stored in an internal-memory structure, the page header is removed, and the tuple information and the page check information stored in the page footer are managed by using a data structure such as a HASH (search) table. That is, the server stores the tuple information and the page check information of the tuple into the HASH table.

The row storage data page is located in the internal memory, so that a response speed of the engine of the database can be improved.

(B): When the target storage format is a column storage format, and the historical-state data of the data item is stored in the database in a data-page structure, the step of dumping, by the server, the historical-state data according to the target storage format may be implemented through the following steps (a) to (c), including:

(a): The server stores the historical-state data of the data item into a column of a page body of the column storage data page.

The column storage data page includes a page header, a page body, and a page footer. The page header is followed by the page body, and the page body is followed by the page footer. The page header is used for storing an xid, and the page body is used for storing at least one column, each column storing version data of a data item. The page footer is used for storing column information of the columns stored in the page body. The server stores the historical-state data of the data item into the columns, and the columns in the column storage data page are sequentially stored in a direction from the page header to the page footer.

Each column includes a column identifier, and the column identifier is used for identifying the column. Each column further includes a plurality of tuple columns, and each tuple column includes a tuple identifier and a quantity of versions of data stored in the tuple column. The tuple identifier is used for identifying the tuple column. For each version of data, a 2-tuple {xid, value} is used for representing an xid operating the version of data.

(b): The server determines an xid of the earliest version of data and an xid of the latest version of data based on the column in the column storage data page, and stores the xid of the earliest version of data and the xid of the latest version of data into the page header of the column storage data page.

The page header includes a field xid_min and a field xid_max. The field xid_min is used for storing earliest xids of all versions of data in the column storage data page, and the field xid_max is used for storing latest xids of all the versions of data in the column storage data page. The earliest xids and the latest xids may be used for constructing an xid index, to help quickly locate column information according to an xid of a historical transaction snapshot subsequently, so as to perform data query.

(c): The server determines column information of the column, and stores the column information into the page footer of the column storage data page.

The page footer is located at the bottom of the column storage data page. The page footer is used for storing the column information of the columns, and is further used for storing check information of the column storage data page. Columns are sequentially stored in a direction from the page header to the page footer in the column storage data page, and the column information of the columns is sequentially stored in a direction from the page footer to the page header. Therefore, the columns and column information form a process starting from two ends toward the middle, until spare space in the middle can no longer store a next column and column information of the next column. The column information of the column includes column identifiers and offsets of the columns in the column storage data page.

The column storage data page is shown in FIG. 2-3. The column storage data page includes a page header 221, a page body 222, and a page footer 223. The page header 221 stores an earliest xid 2211 and a latest xid 2212. The page body 222 is used for storing columns or tuple columns, the columns including column identifiers. A tuple column includes a tuple identifier tupleID and a quantity y of versions of data stored in the tuple column. For each version of data, a 2-tuple {xid, value} is used for representing an xid operating the version of data. The columns or tuple columns are sequentially stored in a direction from the page header to the page footer. The page footer 223 is used for storing page check information and a plurality of pieces of column information, the column information being sequentially stored in a direction from the page footer to the page header.

Figures 1, 2:
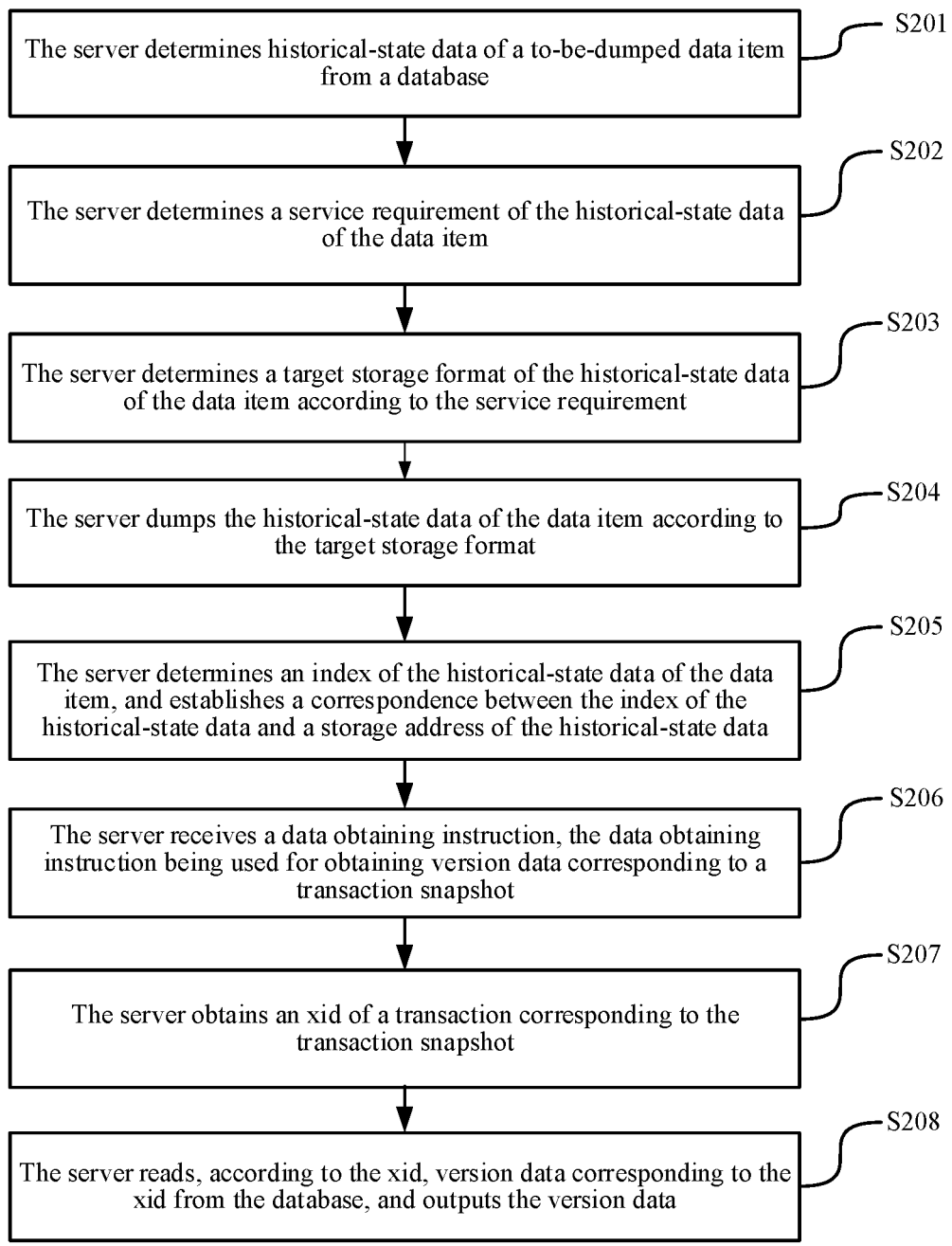
Figure 2:
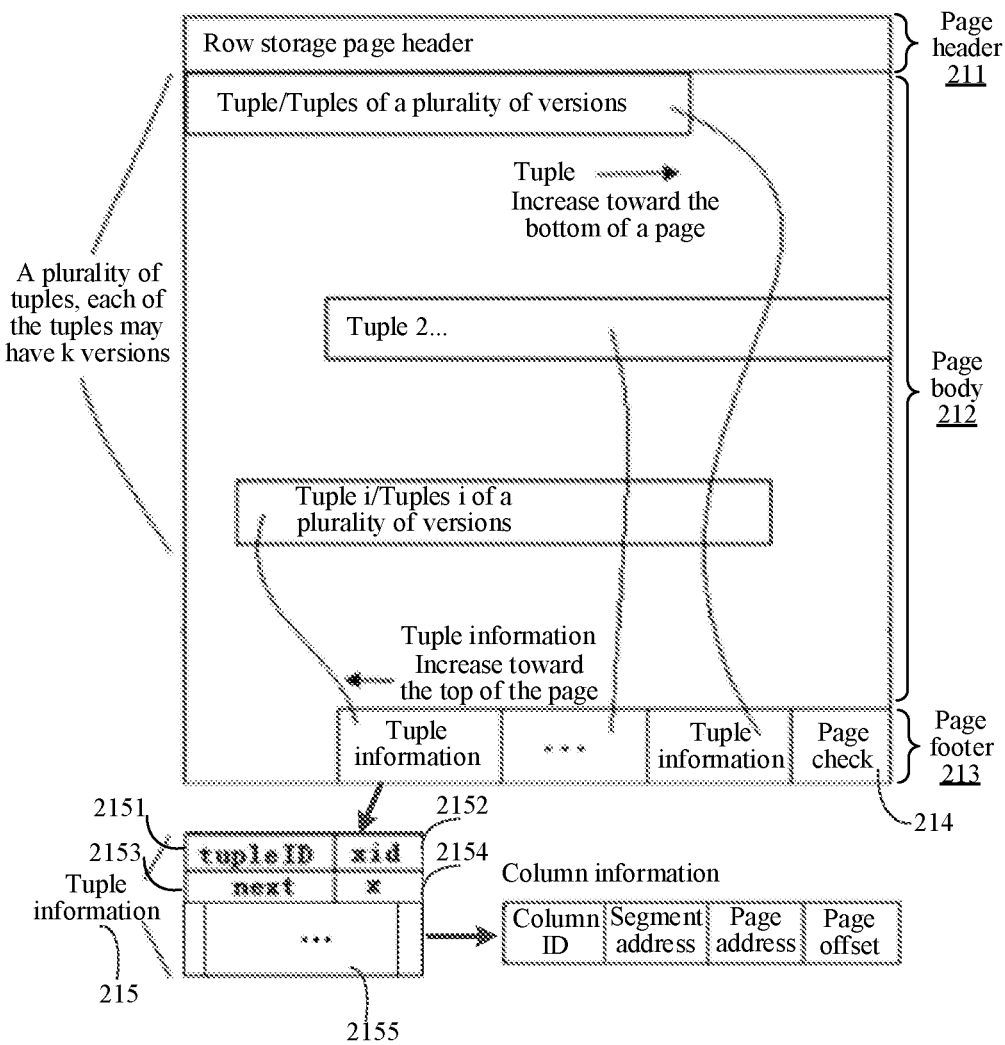
Figures 2, 3:
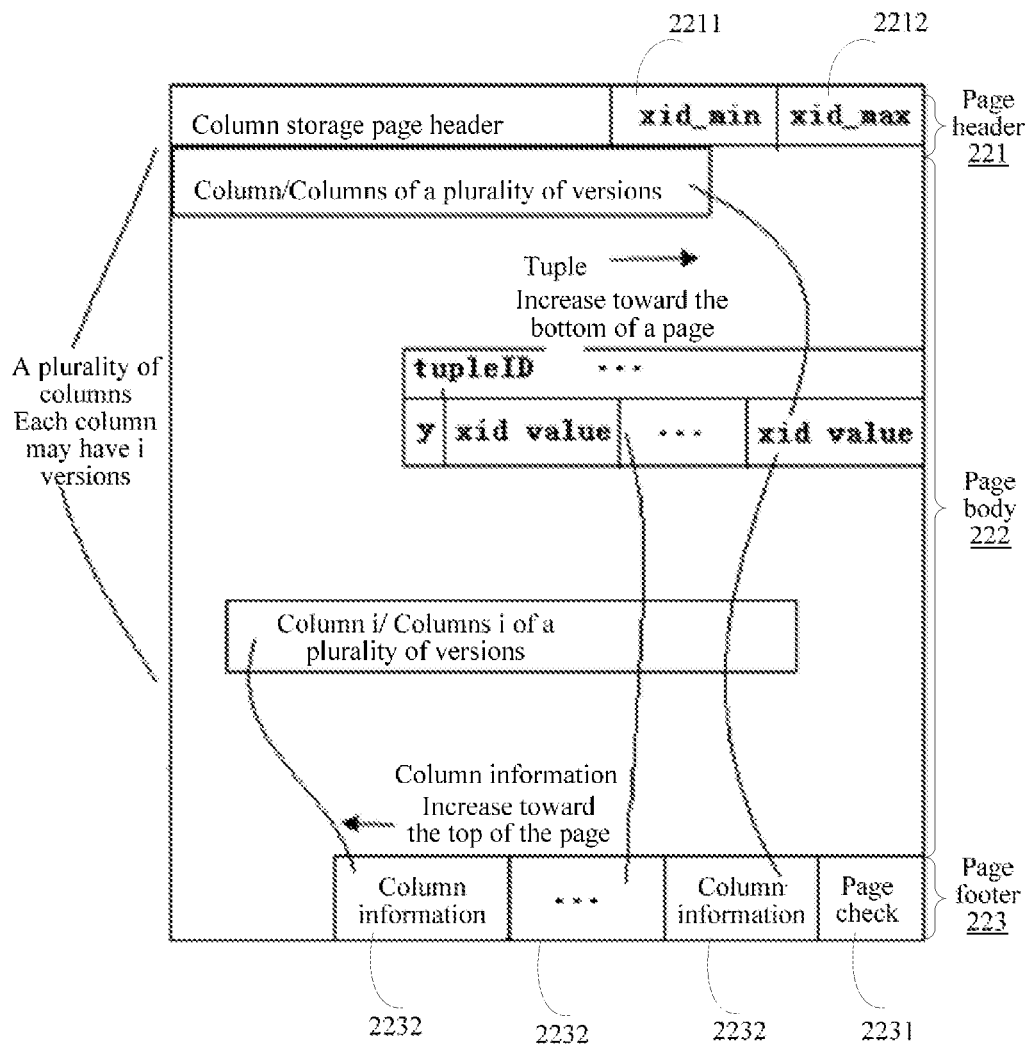
Figures 2, 3, 4:
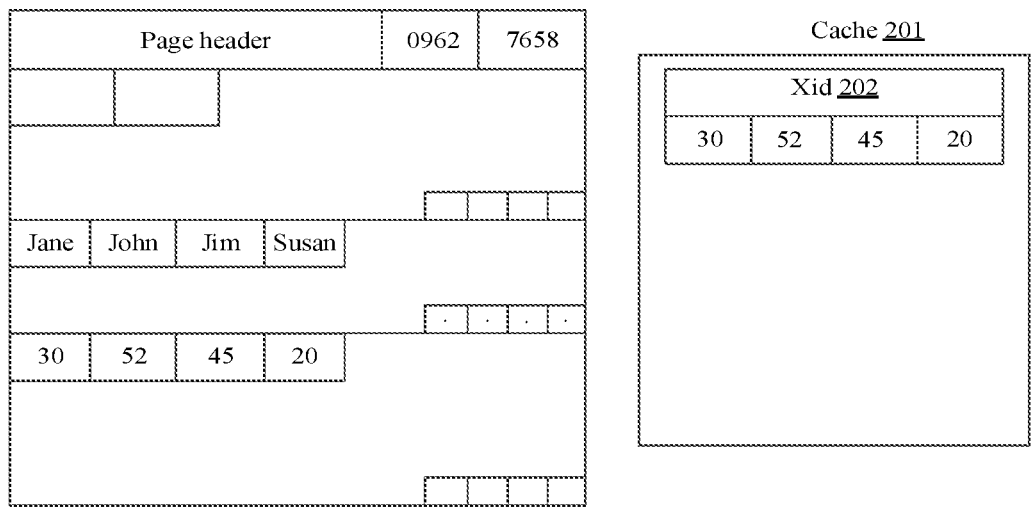
Figures 1, 3:
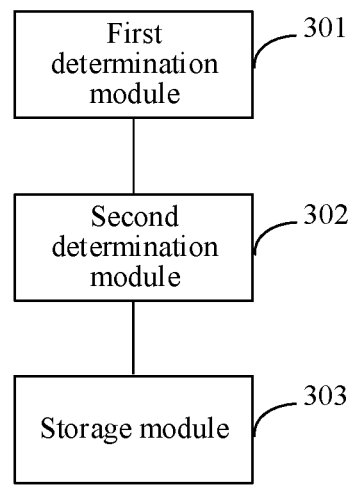
Figures 2, 3:
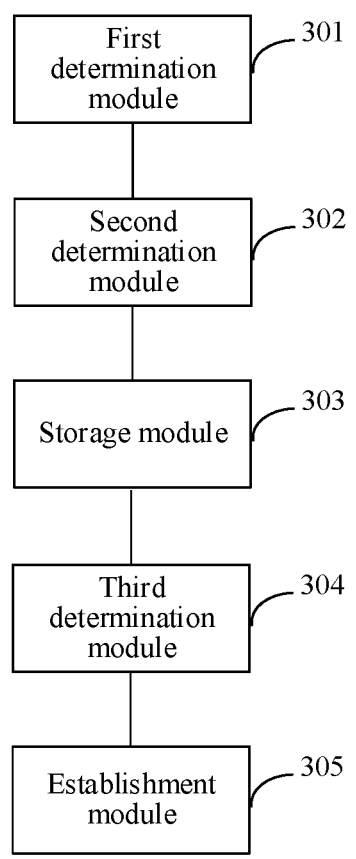
Figure 3:
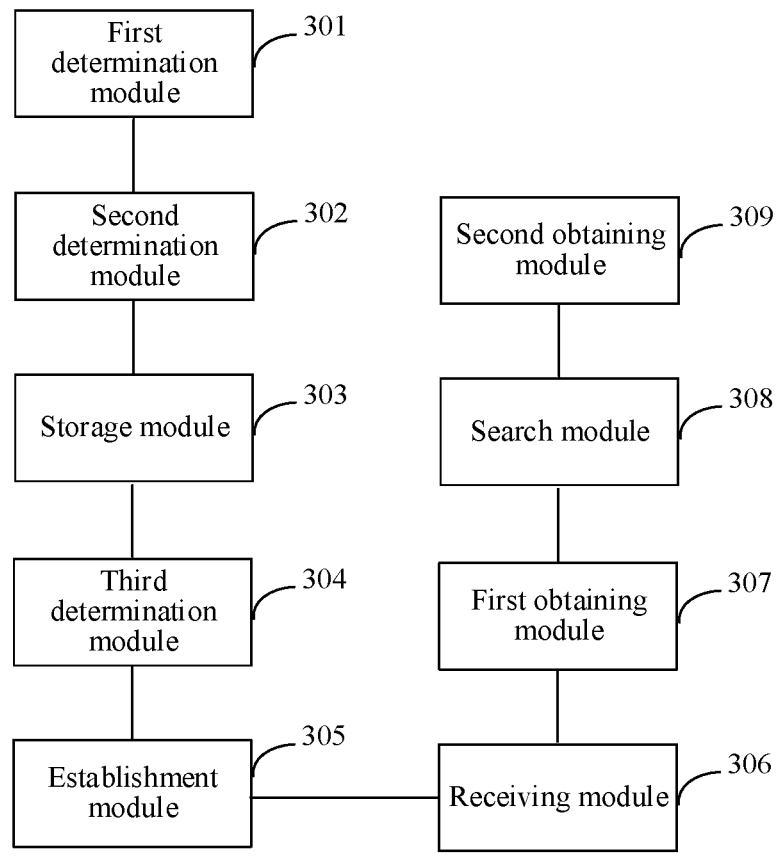
Figure 4:
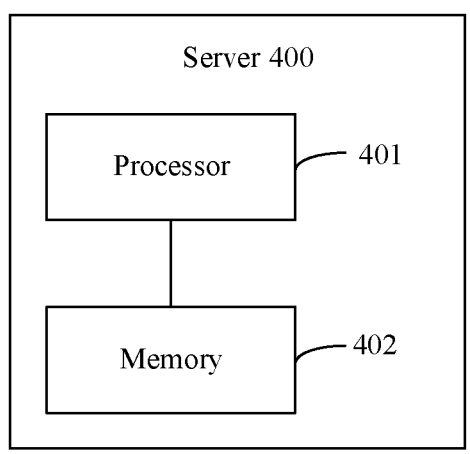

The column storage data page is stored in external storage. Cache may be constructed in the internal memory based on the column storage data page, so as to perform data access based on the cache, thereby speeding up access and improving the efficiency of access. A cache 201 stores an xid 202, as shown in FIG. 2-4. In addition, a segment-page management structure is used in historical-state data in a column storage format, for example, dumping the historical-state data by using the column storage data page shown in FIG. 2-3, so that concepts such as table space can be effectively used, and the column storage data page is independently and continuously stored in the external storage during dumping, thereby helping perform calculation for the columns on column storage.

In this embodiment of this application, the server may directly dump the historical-state data from a row storage format into a column storage format, or directly dump the historical-state data from a column storage format into a row storage format. However, the row storage data page or the column storage data page may be not full, and the historical-state data of the data item is directly dumped into the row storage data page or the column storage data page, which tends to cause a waste of a storage space. Therefore, to avoid the waste of a storage space, in the internal memory, the server establishes a row storage page of internal memory for each tuple, and establishes a column storage page of internal memory for each column. The row storage page or column storage page is referred to as a transitional dump page. During the dumping of the historical-state data of the data item, the historical-state data of the data item is stored in the transitional dump page. In a case that the transitional dump page is filled with version data, the server dumps the version data in the transitional dump page into the row storage data page or the column storage data page, thereby completing physical persistent storage of the row storage data page or the column storage data page.

When dumping the version data in the transitional dump page into the column storage data page, the server may compress column information in the transitional dump page, and dump other information in the transitional dump page and the compressed column information into the column storage data page, so as to save a storage space.

In this embodiment of this application, for one same transitional dump page in the internal memory, the server may extend the transitional dump page into an extension page, for example, extend. The extension page includes a plurality of transitional dump pages. That is, for one same column, there are n consecutive such pages. Therefore, when one extension page is filled with version data, the server dumps the version data in the extension page into the column storage data page, so as to further improve the compression efficiency.

In this embodiment of this application, because an xid of version data in a transitional dump page in the internal memory is unique, the xid of the version data in the transitional dump page and a page identifier of the transitional dump page may be stored in a HASH table. In this way, the HASH table can be searched based on the xid for the transitional dump page, so as to quickly locate the transitional dump page.

After dumping the historical-state data of the data item through the foregoing steps S201 to S204, the server establishes an index of version data in the database through the following step S205, to facilitate subsequent data reading based on the index.

Step S205: The server determines an index of the historical-state data of the data item, and establishes a correspondence between the index of the historical-state data and a storage address of the historical-state data.

In a case that the target storage format of the historical-state data is a row storage format, the index of the historical-state data is a row storage index. In a case that the target storage format of the historical-state data is a column storage format, the index of the historical-state data is a column storage index. Steps of determining, by the server, an index of the historical-state data may be:

(1): in a case that the target storage format is a row storage format, using, by the server, the earliest xid of the historical-state data as a row storage index of the historical-state data; or using a primary key of a data table in which the historical-state data is located and the earliest xid of the historical-state data to form the row storage index of the historical-state data; and (2): in a case that the target storage format is a column storage format, using, by the server, the earliest xid and the latest xid of the historical-state data to form a column storage index of the historical-state data; or using a primary key of a data table in which the historical-state data is located and the earliest xid and the latest xid of the historical-state data to form the column storage index of the historical-state data.

In this embodiment of this application, the server establishes the correspondence between the index of the historical-state data and the storage address of the historical-state data, so that the server can quickly locate and read the historical-state data based on the index of the historical-state data, so as to improve the reading efficiency. In addition, indexes based on xid_min and xid_max on pages are established in the transitional dump page and the column storage data page, thereby speeding up search in column data. In addition, address information in the transitional dump page (or extension page) and the column storage data page is recorded in source data of columns, thereby facilitating sources of the columns to be quickly found.

After the server stores the historical-state data, the terminal may obtain, based on a transaction snapshot, incremental data corresponding to the transaction snapshot form the server through the following step S206.

Step S206: The server receives a data obtaining instruction, the data obtaining instruction being used for obtaining version data corresponding to the transaction snapshot.

When intending to read the incremental data from the server, the terminal transmits a data obtaining instruction to the server, the data obtaining instruction carrying the transaction snapshot. The server receives the data obtaining instruction, and obtains the transaction snapshot from the data obtaining instruction.

Step S207: The server obtains an xid of a transaction corresponding to the transaction snapshot.

The transaction snapshot includes an xid, and the server extracts the xid from the transaction snapshot. The xid in this embodiment of this application may be a timestamp for creating the transaction snapshot. Therefore, the xid and the timestamp may be interchanged, so that it is ensured that a "transaction time" attribute in a temporal database can be implemented.

Step S208: The server reads, according to the xid, version data corresponding to the xid from the database, and outputs the version data.

For any specified transaction snapshot, the server performs search in the row storage index and the column storage index according to an xid in the transaction snapshot. The transaction snapshot is used for obtaining the historical-state data, and the historical-state data may be stored in a column storage format. Therefore, the server preferentially searches the column storage index. In a case that the xid does not exist in the column storage index, the server searches the transitional dump page. In a case that the xid does not exist in the transitional dump page, the server then searches the row storage index, so as to improve query efficiency. In addition, based on the foregoing established indexes, an addressing process can be effectively sped up during data addressing. Correspondingly, this step may be implemented through the following steps (1) to (5), including:

(1): The server searches the column storage index of the database according to the xid.

The column storage index of the database resides in the internal memory. Therefore, the server directly searches a column index of the internal memory for the xid. In a case that the xid is found in the column index, step (2) is performed. In a case that the xid is not found in the column index, step (3) is performed.

(2): In a case that the xid is found from the column storage index, the server reads, according to a storage address corresponding to the xid, version data corresponding to the xid from the column storage data page of the database, and the step ends.

The server stores correspondences between xids and storage addresses. The server obtains, according to the xid, a storage address of to-be-read version data from the correspondences between the xids and the storage addresses, and reads version data corresponding to the xid from the column storage data page according to the storage address.

(3): In a case that the xid is not found from the column storage index, the server searches the transitional dump page of the database according to the xid.

In a case that the xid is found in the row storage index of the database, step (4) is performed. In a case that the xid is not found in the row storage index, step (5) is performed.

(4): In a case that the xid is found from the transitional dump page, the server reads, according to a storage address corresponding to the xid, version data corresponding to the xid from the transitional dump page of the database, and the step ends.

This step is similar to step (2), and details are not described herein again.

(5): In a case that the xid is not found from the transitional dump page, the server searches the row storage index according to the xid. In a case that the xid is found in the row storage index, the server reads, according to a storage address corresponding to the xid, version data corresponding to the xid from the transitional dump page of the database.

In this step, after reading the version data corresponding to the xid, the server transmits the version data to the terminal.

The historical-state data stores starting time and ending time of a transaction. The starting time and the ending time of the transaction provide a physical basis for implementing a temporal transaction in a temporal database, and the historical-state data, and the starting time and the ending time of the transaction are used for determining a change in data within a specified historical time period, thereby satisfying the temporal semantics of a transaction. It can be learned that, based on the content described above, a "bi-temporal database" can be implemented at relatively low costs.

In this embodiment of this application, the server dumps the historical-state data of the data item according to the target storage format corresponding to the service requirement, so that all historical version data of one data item is saved, thereby providing an adequate path for implementing a temporal database. The path is applicable to any relational database or non-relational database using a multi-version concurrency control (MVCC) technology as a concurrency access control technology. The historical-state data is dumped instead of being cleared, so that a temporal database can be implemented at relatively low costs in the current database. In addition, in this embodiment of this application, the current-state data and the transitional-state data of the data item are stored in a row storage format, and the historical-state data of the data item is dumped in a column storage format (or row storage format), thereby distinguishing the historical-state data from the current-state data. Moreover, one same database simultaneously stores data in a row storage format and a column storage format, thereby practically supporting an HTAP database system with temporal attributes. In addition, the historical-state data and the current-state data are stored in one same database, thereby avoiding time-consuming and complex work of a data warehouse and saving resources for storage and calculation.

In this embodiment of this application, a server determines historical-state data of a to-be-dumped data item from a database, and determines a service requirement of the historical-state data; and dumps the historical-state data according to a target storage format corresponding to the service requirement. Therefore, not only full-state data (current-state data, transitional-state data, and the historical-state data) of the data item is stored, but also the historical-state data can be flexibly stored in different storage formats, thereby improving flexibility.

An embodiment of this application provides a data storage apparatus. The apparatus may be applied to a server, and is configured to perform the foregoing data storage method. Referring to FIG. 3-1, the apparatus includes:

a first determination module 301, configured to: determine historical-state data of a to-be-dumped data item from a database, and determine a service requirement of the historical-state data;

a second determination module 302, configured to determine a target storage format of the historical-state data according to the service requirement; and a storage module 303, configured to dump the historical-state data according to the target storage format.

In a possible implementation, the database is an HTAP database, the target storage format is a row storage format or a column storage format, and current-state data and transitional-state data of the data item are stored in the database in a row storage format.

In a possible implementation, the current-state data is stored in the database in an internal-memory structure, and the historical-state data is stored in the database in an internal-memory structure or a data-page structure.

In a possible implementation, in a case that the target storage format is a row storage format, the storage module 303 is further configured to store the historical-state data into a tuple of a page body of the row storage data page.

The storage module 303 is further configured to: determine an xid of the earliest version of data in the tuple based on the tuple in the row storage data page, and store the xid into a page header of the row storage data page.

The storage module 303 is further configured to: determine tuple information of the tuple, and store the tuple information into the page footer of the row storage data page.

In a possible implementation, the storage module 303 is further configured to: use a birth time of the tuple as the xid of the earliest version of data in a case that the tuple is generated by an insertion operation or is an old version generated by an update operation; or use a death time of the tuple as the xid of the earliest version of data in a case that the tuple is generated by a deletion operation or is a new version generated by an update operation.

In a possible implementation, the storage module 303 is further configured to: add, in a case that a plurality of versions of data in the tuple are stored in the row storage data page and a next row storage data page, a page identifier of the next row storage data page to the tuple information.

In a possible implementation, the storage module 303 is further configured to: store the historical-state data into a column of a page body of the column storage data page; determine an xid of the earliest version of data and an xid of the latest version of data based on the column in the column storage data page, and store the earliest xid and the latest xid in a page header of the column storage data page; and determine column information of the column, and store the column information into a page footer of the column storage data page.

In a possible implementation, the storage module 303 is further configured to: store the historical-state data into the transitional dump page; and in a case that the transitional dump page is filled with version data, when the target storage format is a row storage format, dump historical-state data in the transitional dump page into the row storage data page, and when the target storage format is a column storage format, dump historical-state data in the transitional dump page into the column storage data page.

In a possible implementation, the storage module 303 is further configured to: compress column information in the transitional dump page, and dump other information in the transitional dump page and the compressed column information into the column storage data page.

In a possible implementation, referring to FIG. 3-2, the apparatus further includes: a third determination module 304, configured to determine an index of the historical-state data, the index being a row storage index or a column storage index; and an establishment module 305, configured to establish a correspondence between the index of the historical-state data and a storage address of the historical-state data.

In a possible implementation, the third determination module 304 is further configured to: in a case that the target storage format is a row storage format, use the earliest xid of the historical-state data as a row storage index of the historical-state data; or use a primary key of a data table in which the historical-state data is located and the earliest xid of the historical-state data to form the row storage index of the historical-state data.

The third determination module 304 is further configured to: in a case that the target storage format is a column storage format, use the earliest xid and the latest xid of the historical-state data to form a column storage index of the historical-state data; or use a primary key of a data table in which the historical-state data is located and the earliest xid and the latest xid of the historical-state data to form the column storage index of the historical-state data.

In a possible implementation, referring to FIG. 3-3, the apparatus further includes:

a receiving module 306, configured to receive a data obtaining instruction, the data obtaining instruction being used for obtaining version data corresponding to the transaction snapshot;

a first obtaining module 307, configured to obtain an xid of a transaction corresponding to the transaction snapshot;

a search module 308, configured to search the column storage index according to the xid; and a second obtaining module 309, configured to: read, in a case that the xid is found from the column storage index and according to a storage address corresponding to the xid, version data corresponding to the xid from the column storage data page of the database.

In a possible implementation, the search module 308 is configured to: in a case that the xid is not found from the column storage index, search the transitional dump page of the database according to the xid.

The second obtaining module 309 is configured to: read, in a case that the xid is found from the transitional dump page of the database and according to a storage address corresponding to the xid, version data corresponding to the xid from the transitional dump page of the database.

In a possible implementation, the search module 308 is further configured to: in a case that the xid is not found from the transitional dump page of the database, search the row storage index according to the xid.

The second obtaining module 309 is configured to: read, in a case that the xid is found from the row storage index and according to a storage address corresponding to the xid, version data corresponding to the xid from the row storage data page of the database.

In a possible implementation, the historical-state data stores starting time and ending time of a transaction, the starting time and the ending time of the transaction providing a physical basis for implementing a temporal transaction in a temporal database, and the historical-state data, and the starting time and the ending time of the transaction being used for determining a change in data within a specified historical time period.

In this embodiment of this application, a server determines historical-state data of a to-be-dumped data item from a database, and determines a service requirement of the historical-state data; and dumps the historical-state data according to a target storage format corresponding to the service requirement. Therefore, not only full-state data (current-state data, transitional-state data, and the historical-state data) of the data item is stored, but also the historical-state data can be flexibly stored in different storage formats, thereby improving flexibility.

FIG. 4 is a schematic structural diagram of a server according to an embodiment of this application. The server 400 may vary greatly due to different configurations or performance, and may include one or more central processing units (CPUs) 401 and one or more memories 402. The memory 402 stores at least one instruction, the at least one instruction being loaded and executed by the processor 401 to implement the method provided in the foregoing method embodiments. Certainly, the server may further include components such as a wired or wireless network interface, a keyboard, and an input/output interface, to facilitate input/output. The server may further include another component configured to implement functions of a device, and details are not described herein again.

An embodiment of this application further provides a computer-readable storage medium, applied to a server. The computer-readable storage medium stores at least one instruction, at least one program, a code set or an instruction set, the instruction, the program, the code set or the instruction set being loaded and executed by a processor to implement the operations performed by the server in the data storage method according to the foregoing embodiments.

When the data storage apparatus provided in the foregoing embodiments performs data storage, merely divisions of the foregoing functional modules are used as an example for description. During actual application, the foregoing functions may be allocated to and completed by different functional modules according to requirements, that is, the internal structure of the apparatus is divided into different functional modules, to complete all or some of the foregoing described functions. Besides, the data storage apparatus provided in the foregoing embodiments and the embodiments of the data storage method belong to the same concept. For a specific implementation process, refer to the method embodiments. Details are not described herein.

A person of ordinary skill in the art may understand that all or some of steps of the embodiments may be implemented by hardware or a program instructing related hardware. The program may be stored in a computer-readable storage medium. The storage medium may be a read-only memory, a magnetic disk or an optical disc.

The foregoing descriptions are merely exemplary embodiments of this application, and are not intended to limit this application. Any modification, equivalent replacement, improvement and the like made within the spirit and principle of this application shall fall within the protection scope of this application.

What is claimed is:

1. A data storage method, performed by a server, and comprising: determining historical-state data of a data item from a database, a value of the data item having a plurality of versions created over time, current-state data including a predefined plural number of latest versions of the value of the data item, the historical-state data including one or more remaining earlier versions of the value of the data item;

determining that a service requirement of the historical-state data complies with one of transactional processing and analytical processing;

selecting a target storage format of the historical-state data from a column storage format and a row storage format according to the service requirement of the historical-state data; and while keeping the current-state data including the predefined plural number of latest versions of the value of the data item in the database, dumping into a storage space the historical-state data including the one or more remaining earlier versions of the value of the data item according to the selected target storage format, the storage space distinct from the database.

2. The method according to claim 1, wherein the database is a hybrid transactional/analytical processing (HTAP) database, the target storage format is the row storage format or the column storage format, and the current-state data of the data item are stored in the database in the row storage format.

3. The method according to claim 2, wherein the current-state data is stored in the database in an internal-memory structure, and the historical-state data is stored in the database in the internal-memory structure or a data-page structure.

4. The method according to claim 1, wherein the dumping the historical-state data according to the target storage format comprises:
dumping, according to the target storage format, the historical-state data into a data page corresponding to the target storage format.

5. The method according to claim 4, wherein in a case that the target storage format is the row storage format, the dumping, according to the target storage format, the historical-state data into a data page corresponding to the target storage format comprises:
storing the historical-state data into a tuple of a page body of a row storage data page;
determining a transaction ID (xid) of the earliest version of data in the tuple based on the tuple in the row storage data page, and storing the xid into a page header of the row storage data page; and
determining tuple information of the tuple, and storing the tuple information into a page footer of the row storage data page.

6. The method according to claim 5, wherein the determining an xid of the earliest version of data in the tuple based on the tuple in the row storage data page comprises:
using an initial time of the tuple as the xid of the earliest version of data in a case that the tuple is generated by an insertion operation or is an old version generated by an update operation; or
using a final time of the tuple as the xid of the earliest version of data in a case that the tuple is generated by a deletion operation or is a new version generated by an update operation.

7. The method according to claim 5, further comprising:
adding, in a case that a plurality of versions of data in the tuple are stored in the row storage data page and a next row storage data page, a page identifier of the next row storage data page to the tuple information.

8. The method according to claim 4, wherein in a case that the target storage format is the column storage format, the dumping, according to the target storage format, the historical-state data into a data page corresponding to the target storage format comprises:
storing the historical-state data into a column of a page body of a column storage data page;
determining a transaction ID (xid) of the earliest version of data and an xid of the latest version of data based on the column in the column storage data page, and storing the earliest xid and the latest xid in a page header of the column storage data page; and
determining column information of the column, and storing the column information into a page footer of the column storage data page.

9. The method according to claim 4, wherein the dumping the historical-state data according to the target storage format comprises:
storing the historical-state data into a transitional dump page;
in a case that the transitional dump page is filled with version data, dumping historical-state data in the transitional dump page into a row storage data page in a case that the target storage format is the row storage format; or
dumping historical-state data in the transitional dump page into a column storage data page in a case that the target storage format is the column storage format.

10. The method according to claim 9, wherein the dumping historical-state data in the transitional dump page into a column storage data page comprises:
compressing column information in the transitional dump page, and dumping other information in the transitional dump page and the compressed column information into the column storage data page.

11. The method according to claim 1, further comprising:
determining an index of the historical-state data, the index being a row storage index or a column storage index; and
establishing a correspondence between the index of the historical-state data and a storage address of the historical-state data.

12. The method according to claim 11, wherein the determining an index of the historical-state data comprises:
in a case that the target storage format is the row storage format, using the earliest xid of the historical-state data to form a row storage index of the historical-state data; or using a primary key of a data table in which the historical-state data is located and the earliest xid of the historical-state data to form the row storage index of the historical-state data; and
in a case that the target storage format is the column storage format, using the earliest xid and the latest xid of the historical-state data to form a column storage index of the historical-state data; or using a primary key of a data table in which the historical-state data is located and the earliest xid and the latest xid of the historical-state data to form the column storage index of the historical-state data.

13. The method according to claim 12, further comprising:
receiving a data obtaining instruction, the data obtaining instruction being used for obtaining version data corresponding to a transaction snapshot;
obtaining an xid of a transaction corresponding to the transaction snapshot;
searching the column storage index according to the xid; and
in a case that the xid is found from the column storage index, reading, according to a storage address corresponding to the xid, version data corresponding to the xid from a column storage data page of the database.

14. The method according to claim 13, further comprising:
in a case that the xid is not found from the column storage index, searching the transitional dump page of the database according to the xid; and
in a case that the xid is found from the transitional dump page of the database, reading, according to a storage address corresponding to the xid, version data corresponding to the xid from the transitional dump page of the database.

15. The method according to claim 14, further comprising:
in a case that the xid is not found from the transitional dump page of the database, searching the row storage index according to the xid; and
in a case that the xid is found from the row storage index, reading, according to a storage address corresponding to the xid, version data corresponding to the xid from the row storage data page of the database.

16. The method according to claim 1, wherein the historical-state data stores starting time and ending time of a transaction, the starting time and the ending time of the transaction providing a physical basis for implementing a temporal transaction in a temporal database, and the historical-state data, and the starting time and the ending time of the transaction being used for determining a change in data within a specified historical time period.

17. A data storage server, comprising one or more processors, memory and programs stored in the memory that, when executed by the one or more processors, cause the server to perform a plurality of operations including: determining historical-state data of a data item from a database, a value of the data item having a plurality of versions created over time, current-state data including a predefined plural number of latest versions of the value of the data item, the historical-state data including one or more remaining earlier versions of the value of the data item; determining that a service requirement of the historical-state data complies with one of transactional processing and analytical processing; selecting a target storage format of the historical-state data from a column storage format and a row storage format according to the service requirement of the historical-state data; and while keeping the current-state data including the predefined plural number of latest versions of the value of the data item in the database, dumping into a storage space the historical-state data including the one or more remaining earlier versions of the value of the data item according to the selected target storage format, the storage space distinct from the database.

18. The data storage server according to claim 17, wherein the dumping the historical-state data according to the target storage format comprises:
dumping, according to the target storage format, the historical-state data into a data page corresponding to the target storage format.

19. The data storage server according to claim 17, wherein the plurality of operations further comprise:
determining an index of the historical-state data, the index being a row storage index or a column storage index; and
establishing a correspondence between the index of the historical-state data and a storage address of the historical-state data.

20. A non-transitory computer-readable storage medium, storing at least one instruction, at least one program, and a code set or an instruction set, the instruction, the program, and the code set or the instruction set being loaded and executed by a processor to implement operations including: determining historical-state data of a data item from a database, a value of the data item having a plurality of versions created over time, current-state data including a predefined plural number of latest versions of the value of the data item, the historical-state data including one or more remaining earlier versions of the value of the data item; determining that a service requirement of the historical-state data complies with one of transactional processing and analytical processing; selecting a target storage format of the historical-state data from a column storage format and a row storage format according to the service requirement of the historical-state data; and while keeping the current-state data including the predefined plural number of latest versions of the value of the data item in the database, dumping into a storage space the historical-state data including the one or more remaining earlier versions of the value of the data item according to the selected target storage format, the storage space distinct from the database.

* * * * *